Jan. 25, 1966   E. C. YOUNG   3,231,219
BUFFER FOR HIGH-SPEED CRAFT
Filed Sept. 3, 1963   3 Sheets-Sheet 1

INVENTOR.
Everett C. Young

_United States Patent Office_

3,231,219
Patented Jan. 25, 1966

3,231,219
BUFFER FOR HIGH-SPEED CRAFT
Everett C. Young, 27955 Lorain Road, North Olmsted, Cuyahoga County, Ohio
Filed Sept. 3, 1963, Ser. No. 306,175
23 Claims. (Cl. 244—1)

This invention relates to spaceships and/or re-entry vehicles, and more particularly, to those space vehicles re-entering a planetary atmosphere from an orbital path or from a journey through space, and which upon descent towards the earth or other planet must penetrate and pass through the relatively dense portion of the atmosphere at high velocity.

The primary object of the invention is to provide a spaceship with a special buffer or protective cover, or what is commonly known as a heat shield, capable of harnessing the tremendous heat generated by frictional heat upon penetrating and passing through the denser portion of a planet's atmosphere, while at the same time being so constructed as to dissipate the tremendous heat in a manner very similar to the phenomenon that occurs when a meteorite enters our earth's atmosphere and lands upon the ground. Throughout the ensuing specification and claims the term "spacecraft" is intended to cover any re-entry vehicle, spaceship, re-entry device, data capsule, or other manned re-entry vehicle. The term "buffer" is used throughout the ensuing specification instead of the conventional term of "heat shield" because there is much evidence from available data about re-entry shields in the present day manned orbital missions which indicate that a protective cover is needed that "buffets" or "buffs" its way down through the various cold and warm air layering and varying densities of the atmosphere while at the same time being progressively stripped of some of its materials. Also the term "buffer" is intended to be a protective cover of sufficient thickness for harnessing the frictional heat and/or combustion upon re-entry in contradistinction to the present day heat shield which is thin in cross section when compared to this invention and which is designed to shield by a high angle of attack, and be braked and/or slowed down by conventional parachutes at a much higher altitude. In other words the term "buffer" refers to a protective bumper on the front of a spacecraft fuselage and is designed to bear the brunt of collision with the atmosphere during high-speed entry. It is composed of layers and sections of materials of which function differently for the type of atmospheric environment it is penetrating, whether said environment is cold or warm, while at the same time harnessing the frictional heat while moving at a high velocity and until a lower velocity is reached. Whereas, the present day heat shield has only one thin shield which functions the same in all types of conditions in the atmosphere during re-entry whether at high velocity or low velocity or regardless of temperature of the atmosphere and its densities. Furthermore, the term "atmosphere" here refers to that region above the earth or other planet having an atmospheric density whose properties of density and gaseous make-up are such as to cause the generation of intense heat when traversed by a rapidly moving body during re-entry or entry from the orbital path or from outer space. Also, the term "meteorite" when referred to here is that solid mineral substance which moves at high velocity through outer space, which is too small to be called a planet, but which upon entry into our atmosphere makes a blazing fiery-like trail in the sky called a meteor, and then upon its arrival on the ground is found to be cold and then becomes identified by a meteoriticist as a "meteorite." The term "meteor" refers only to the incandescenec associated with the blazing path or fiery light created by the meteorite. Also a meteoriticist is a scientist who makes the research and study of meteorites his sole vocation.

Another primary object of the invention is to provide a spacecraft fuselage with a special buffer which utilizes or harnesses the burning phenomenon experienced when the buffer encounters the atmosphere at tremendous velocities, in contradistinction to present methods which employ a heat shield which absorbs heat either by "heat sink" methods or by a composition which boils, chars, or peels off, or in other words, which resists the burning phenomenon. Also there is no comparison between this invention and those methods that are presently planned which have leading wings or leading edges of appendages which expand or contract according to the intensity of frictional heat. In other words this buffer is designed to harness natural forces or utilize to full advantage the burning phenomenon as opposed to those present techniques which resist natural forces and which attempt to eliminate burning by using already oxidized materials. From available data, it is apparent that a vehicle, spaceship, or satellite falling towards earth during high velocity increases said velocity to such an extent that the frictional heat generated at the forward surface becomes in excess of 3,000 degrees F. Hence, in the future, spaceships returning from space journeys or from orbiting the earth will sometimes and perhaps many times have to re-enter the atmosphere at speeds ranging from 10,000 miles per hour to 50,000 miles per hour and perhaps in the not too distant future enter at a speed in excess of 50,000 miles per hour. It then becomes apparent that this frictional heat will be far beyond the melting point of any known materials capable of serving as a heat shield, rocket shell, or body and thus will burn or disintegrate no matter what material is used. Also, present ablation techniques and conventional appendages will be useless during re-entry due to the tremendous speeds and heat up involved and the capsule will roll or turn during descent making it very inconvenient to pilot the spacecraft to a landing. Furthermore, passengers, who cannot tolerate the turning or roll of a spaceship during re-entry will experience tremendous nausea, dizziness, or sickness. Therefore one of the main features of this buffer invention is to orient the spacecraft so that it remains in a fixed position during re-entry so that passengers and the crew can sit upright and thus enjoy a more convenient and pleasurable flight trajectory towards a planet as said re-entry is being made.

According to available data made from careful studies, it is apparent that a strong parallelism exists between a meteorite fall and the re-entry of a nose-cone, data-capsule, or other re-entry vehicle into the atmosphere. Therefore, it has been reasonably established that the best shape for a buffer for a space ship from the standpoint of heat generation and transmission of heat is the spherical or hemispherical shape. Thus, according to the invention, it is intended to provide a spacecraft initially with that blunt shape or dome shape most suited aerodynamically for penetrating the atmosphere, harnessing the frictional heat or combustion phenomenon, remaining in an oriented position but changing form, as it descends, to that most desirable for dissipation of heat from reaching valuable instruments or from reaching the environment in which the pilot, crew, or other human occupants are sitting in or reclining within. Furthermore, as early as 1933, it was apparent to one authority on meteoritics that with the falling meteorite there is a critical velocity beyond which aerial friction operates differently from its effect at lower velocities. Above this critical velocity the leaward rear slopes of the moving body tend to escape the destructive effects of friction. This same phenomenon, over twenty years later, was proven in the laboratory by scientists and aerodynamicists.

In attaining the objects of the invention, it is now proposed to provide a re-entry spacecraft fuselage with a special buffer having a blunt or dome-like shape, and a plurality of relatively cold or frozen sections and layers or segments, the materials of which progressively copies the burning phenomenon of the falling meteorite. It has been established fairly accurately by meteoriticists that those blunt shaped meteorites which fell through earth's atmosphere in an oriented manner or position and which fell upon the earth were found to be cold. In fact, there were meteorites found soon after falling which had frost form on them, and in the warm month of summer. Furthermore, it has been established that falling meteorites that do strike the earth are nearly all cold and a closer look at why this phenomenon occurs is worth evaluating and applying to this invention. Since meteorites have been moving through space where the temperature is estimated to be 459 degrees F. below zero and whereupon even with the radiated heat from the sun upon them would not raise their temperature much above the melting point of ice on the exposed side (32 degrees F.), and whereupon their re-entry velocity into earth's atmosphere is so great that combustion or ablation of the forward surface during entry takes place so rapidly that ablation actually outruns heat penetration. In other words, new fresh cold material is constantly taking the place of other material as fast as it is being stripped away by frictional heat and air pressure. This phenomenon becomes elementary when one considers the fact that a very cold object will require much longer for heat to conduct and penetrate than it would if the same object were already at normal temperature. A very simple example is the fact that it will take a human being much longer to become warmed up in a heated room after being exposed to the cold environment of winter than it would for another human being who merely stepped in from another room adjoining the heated room and which had the same room temperature. Furthermore, it has been found through extensive laboratory tests in metals and silicates that the heat rarely penetrates the surface more than one centimeter.

In further attaining the objects of the invention, it is now proposed to provide a spacecraft with a special buffer which has within its construction provisions for the inclusion of a refrigerant or a solid matter such as Dry Ice. Before launching the spacecraft the buffer containing the Dry Ice is kept under refrigeration until just before launch time or "lift off." "Lift off" here means the time at which the rocket boosters push the spacecraft up from the ground launch pad by tremendous thrust from the rockets. After the spacecraft is in orbit or on a journey through space the Dry Ice, which has a temperature of —110 degrees F. below zero will within a short time freeze or maintain the buffer materials in a very cold state. Since the Dry Ice is contained in a special construction and hidden from the sun it therefore cannot be effected by the radiated heat from the sun. Furthermore, it has been concluded in experiments that Dry Ice cannot sublimate within a vacuum that is approximately a 98 percent to 100 percent vacuum. That is, without a supply of oxygen and already being in a cold environment, Dry Ice cannot sublimate and therefore will keep the buffer materials on the front of the spacecraft congealed with cold. Thus, when the spacecraft fuselage with buffer re-enter the atmosphere at tremendous velocity there can be no heat penetration whatsoever due to the fact that the buffer is very cold and the fact that the air pressure strips away the melted material as fast as new fresh cold material is exposed. A simple experiment which is akin to this phenomenon is merely for a human being to hold one hand underneath a cold running water faucet for about twelve seconds and then put the same hand underneath a hot running water faucet. Merely by placing the other hand, which has not been exposed to the cold water, underneath the running hot water one can readily understand and experience that the hand that was under the cold water and then exposed to the hot water can remain under the hot water considerably longer than the hand that was not exposed to the cold water. As has been pointed out it naturally takes more time for heat to penetrate a cold substance and this phenomenon can be applied to this invention. It is important to note here again that this burning and/or oxidation, or ablation is used in contradistinction to present conventional methods which employ already fully oxidized materials which are not kept in a cold state. The buffer materials in this invention are intended to employ combustion or to oxidize when bombarded with oxygen molecules during re-entry.

Furthermore, studies of meteorites indicate that this invention approximates an important principle which is not yet utilized in re-entry design—the use of a burning buffer in combination with Dry Ice which has absolutely no thermal conductivity and which dissipates heat 100 percent laterally when heat or a flame is put upon it. One only needs to put a blue propane torch flame of 3660 degrees F. or oxyacetylene torch of 6,000 degrees F. upon Dry Ice to confirm this phenomenon. Sometimes the sublimating Dry Ice will even extinguish the torch since the sublimating gas is carbon dioxide. Therefore the proper understanding and utilization of the principles deduced from meteoritic aerial flight is of great importance to the future of space flight.

Another primary object of the invention is to provide a space-craft fuselage with a special buffer which while undergoing combustion or ablation will produce fins for a stabilized or oriented flight, and thus keep the passengers and crew in an upright position as heretofore mentioned. This has an added advantage in that the pilot or astronaut can always be in an upright position for convenient steering and control of the spacecraft during entry and then for flight to a landing at the bottom end of his trajectory. In other words, the invention by utilizing a special buffer which is designed to use differential liquefaction or differential ablation and which can be ejected as explained and illustrated hereafter, makes possible the composite entry. That is, the spacecraft can re-enter the atmosphere without lift (no wings) and at a later time at the bottom of the trajectory and at a lower speed use lift (use wings) and actually fly to a landing on the ground or on an aircraft carrier. Therefore, the ideal re-entry is the one that utilizes the composite entry as mentioned heretofore but at the same time utilizing the high velocity through a slightly longer flight in combination with a frozen or very cold buffer. This makes for better orientation and correct carving of the front of buffer.

Meteorites in museums across the world display their surface features which show "pitting" or holes on the forward side that met the brunt of collision with the atmosphere when they fell toward earth. It is evident that the reason this pitting took place is due to the fact that near the end of flight there were materials in the meteorite which were still melting and being stripped out by air pressure while other material with a much higher melting temperature had quit melting at the lower velocity. However, when the meteorite first entered the atmosphere both or all meterials regardless of melting temperature were burned, melted, or ablated away. It is evident that the most suitable surface temperature for the development or formation of stabilizing fins on the front of this buffer invention or "streamlined pitting" would be one above the melting point of one constituent and below the melting point of another. Thus differential liquefaction or differential ablation can be accomplished and utilized to tremendous advantage on this buffer invention as this phenomenon keeps the spacecraft in an oriented position during re-entry and can make it come in straight as an arrow. Also it is apparent that the tremendous increase in frictional resistance which greater velocities occasion is favorable to orientation.

Still another primary object of the invention is to provide a spacecraft with a special buffer which is adjustable for various re-entry speeds of space vehicles returning from outer space. By controlling the size of the buffer by use of extensible appendages it becomes apparent how easy it is to increase the braking action or increase the resistance to passage through the atmosphere. After the critical velocity of re-entry has been attained the spacecraft can be further slowed by the adjustable or extensible appendages illustrated in the drawings and thus the speed can be checked or "braked" according to its approach velocity, size of ship, weight, and the angle of re-entry.

Still another object of the invention is to provide a buffer of sufficient thickness to protect the astronaut from collisions with smaller meteorites that are constantly moving at high speed through outer space.

Another object of the invention is to provide a spacecraft with a special buffer which produces a luminous shroud around the spacecraft during re-entry much like a falling meteor. This offers better tracking arrangements for radar and ground computing equipment, as well as a visible entry on clear nights. This luminous shroud would also be an aid to other astronauts or passengers in other spacecraft which are orbiting the earth awaiting for re-entry instructions from an earth control tower or orbiting space tower platform, since the pilot can actually look out and see the fiery path that another spaceship made when it entered the atmosphere. This luminous shroud should be very useful to other earth based commercial airliners which might go astray of the designated flight path and enter a portion of the country where only re-entries made by spaceships are made. The pilot seeing the meteorlike path in the sky or 'fireball" going towards earth would know that his airship was approaching restricted areas and then exercise due caution in steering his plane away from these areas. This luminous shroud should be especially useful as a safety precaution since it should prevent collisions within the re-entry path. It would be fairly accurate for one to predict that colliding re-entry vehicles probably will not reach the ground in a considerable number of collisions since their exploding vehicles and apparent destruction within the atmosphere during tremendous velocities will causes them to disintegrate and/or burn up before they strike the ground.

Another object of the invention is to provide a spacecraft fuselage with a buffer which while harnessing the burning phenomenon upon re-entry will produce a natural drag upon the vehicle. Air resistance produces heat and flame which retards velocity and while ablation and/or vaporization of the anterior portion of the buffer is a by-product of friction it nevertheless serves as a natural "brake" as the heat and flame set up an aerodynamic drag in the surrounding airstream. This elementary phenomenon can best be proved by watching burning and non-burning balls of paper fall from a great height, say for a one story building. The burning balls of paper will always be retarded by the burning and arrive on the ground later than the non-burning balls. The most natural phenomenon which proves this feature of the invention lies in the fact that if it weren't for the aerodynamic drag upon millions of meteorites which constantly fall towards the earth every hour then people on the earth would be bombarded by "raining pellets" and many thousands killed daily as there would be meteorites the size of the fist or head falling continually to the ground. However, the burning phenomenon produces the aerodynamic drag necessary to effectively slow up and burn up the meteorite within five to twenty miles from the ground. This phenomenon is very important when one considers the fact that about 200,000,000 visible meteors enter the atmosphere daily and that about 1,000 tons is added daily to the weight of the earth. It is even more important when one considers that these meterorites enter at a speed of around 94,320 miles per hour and only about an average of eight to twelve strike the earth every twenty-four hours. Even further important is the fact that the heat created from these speeds rarely penetrates the surface beyond one centimeter on the larger specimens and which do not move as fast.

Still another object of this invention is to provide a spaceship with a special buffer which can be moved away from the main body of the ship during space flight to allow the occupant or pilot to have a better view of the earth and the surrounding universe. Another advantage of this feature is the fact that upon closing the buffer against the main body of the ship will then capture or enclose a vacuum since the oxygen molecules taken up from earth during launch time will have dissipated into the vacuum of space when the buffer was moved away from the ship as aforementioned. This vacuum, captured or enclosed between the cockpit of the spacecraft and the buffer then serves as further insulation against frictional heat by preventing convection and conduction of heat from penetrating the pilot's quarters or the passenger compartment.

Another object of the invention is to provide for the composite entry previously mentioned as this type of entry is more safe since it utilizes the amazing flight history of the test pilot or astronaut to full advantage. In present techniques the astronaut has limited control over his craft or capsule during re-entry and he must fall hanging by a parachute and drop into ocean water. This buffer invention with means for composite entry eliminates the dangerous hazard of dropping into ocean water as the pilot can select his place of landing, and it is also a more dignified manner for such brave and talented test pilots to use.

Another important feature of the invention is that this buffer has portholes within it so that the astronaut can look outside his cockpit and watch the retro rockets fire prior to re-entry of the atmosphere, in contradistinction to present methods whereby the astronaut cannot see his retro rockets fire since these are strapped to the rear of his capsule. It has already been reasonably established from previous re-entries with a main in the re-entry capsule that the present position of retro rockets placed on the shield are not favorable and in one documented flight the retro pack actually burned off placing the astronaut in a precarious position and in a frustrated state of mind because he actually did not know what was taking place on the shield in back of him.

Another object of the invention and perhaps the most important feature of this buffer is that it is most economical to employ. That is, this invention provides a means by which spacecraft can have multiple flights, use the same fuselage over and over again, and be very convenient for the construction of a space platform in orbit around the earth. Also the composite entry as already mentioned can eliminate as much as 60 percent of the cost of employing over 50,000 persons who presently make up the recovery force and who rescue the astronaut. Also delays or "holds" due to bad weather conditions will not be a factor since the astronaut can actually select his place of re-entry and landing on earth and avoid areas with bad weather conditions. It has already been established and realized by those people who are associated with the delays and "holds" during launching an astronaut into orbit that the costs of such delays are astronomical.

These and other objects as well as the apparent advantages of this invention will be more readily comprehended by those skilled in the art as reference is made to the following detailed description when considered in connection with the accompanying drawings, wherein:

FIG. 6 is a partial cross sectional view of the buffer with modifications showing one of its extensible and retractable appendages in side elevation with it in complete extended position with part of the appendage cross sectioned to clearly indicate the openings therein and the stair step construction.

Figure 1:
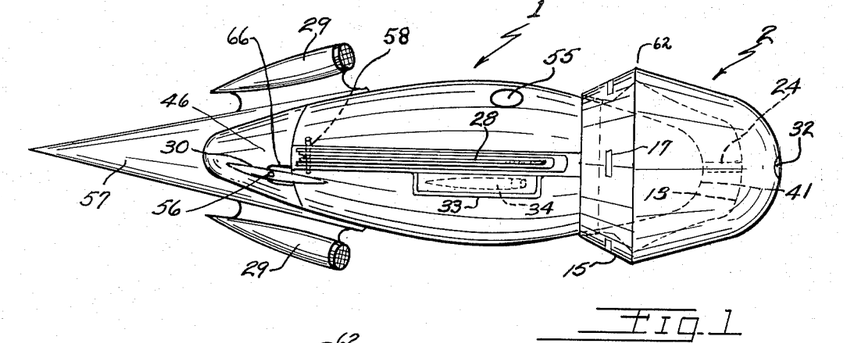
FIG. 1 is a side elevation illustrating one embodiment of this buffer invention whereby the whole dome shaped structure is in closed position over the front end portion of a spacecraft fuselage as it would appear in horizontal flight through space or in the orbital path around a planet.
Figure 2:
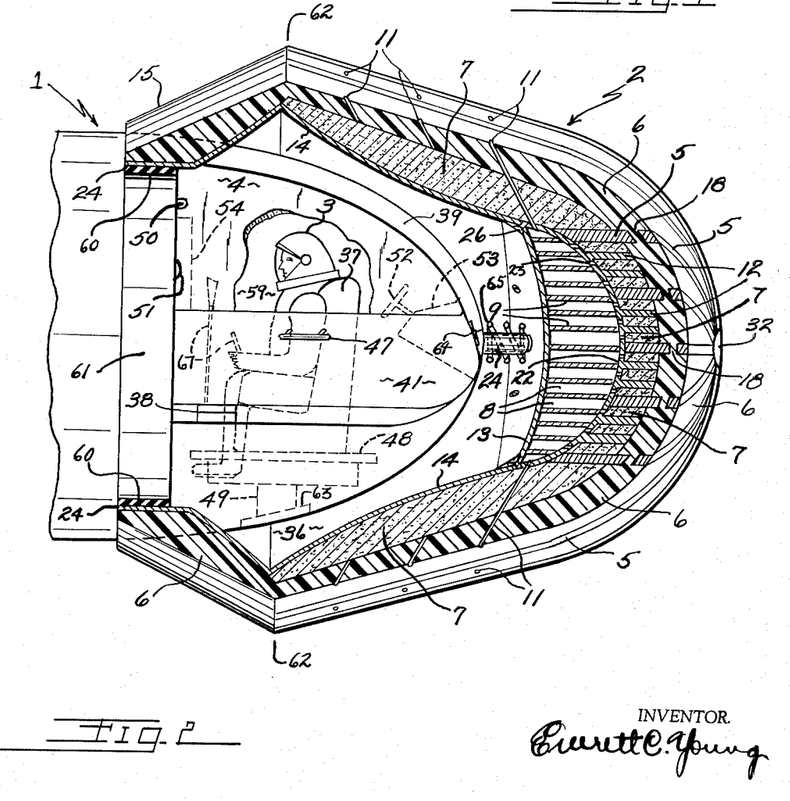
FIG. 2 is a partial sectional elevation view of the protective buffer showing the materials and construction of which are clearly cross sectioned to illustrate the full measure of protection provided the astronaut, showing also the components and arrangements of materials with various melting temperatures as well as the compartment for refrigeration containing Dry Ice which is situated directly in front of the cockpit portion of the spacecraft.

Referring to FIG. 1 and FIG. 2 in the drawings I have illustrated the invention embodied on or applied to the nose portion 41 of a spacecraft fuselage 1 wherein the dome shape buffer 2 is positioned directly over and around the nose portion 41 which encloses the cockpit 59 so that it forms a leading end portion which bears the brunt of collision with an atmosphere when the spacecraft fuselage 1, the buffer 2, and the retro rockets 29 start to enter the atmosphere from the orbital path or from a journey through space.

Figure 3:
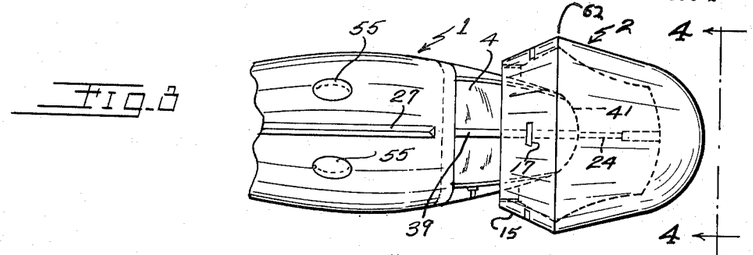
FIG. 3 is a top view of the buffer invention in the extended position over the front end portion of a spacecraft fuselage.

The buffer 2 has a cylindrical telescoping construction 24 used simultaneously at two places, one of these being where the tapered rear portion 15 of buffer 2 surrounds the entire circular recessed portion 61 adjacent the cockpit 59 whereas this circular recessed portion 61 is encompassed by a gasket 60 and the other one located and slidably secured at a point between the center of the metal bottom support 13 and the tip end of the nose portion 41. As should be readily understood by this construction it is apparent how conveniently operable it is to move the whole buffer 2 backwards and forwards upon the cylindrical telescoping construction 24 by controlling within the cockpit 59 and thus position the buffer 2 in a forward position as illustrated in FIG. 3 and in FIG. 8a.

Referring now to FIG. 1 and FIG. 6 the tapered rear portion 15 of the buffer 2 has portholes 17 placed around its periphery. Two emergency parachute compartments 55 are spaced oppositely each other on the top side of the spacecraft fuselage 1. Approximately midway up on opposite sides of the spacecraft fuselage 1 there are elongated openings or recesses wherein the telescoping wings 28, the cowlings 33, and the propulsion rockets 34 indicated by a dotted line are located within said spacecraft fuselage 1. The tapered elongated fuselage 1 is capped on the rear end by a cone 46 and positioned around and over this cone 46 is a hypersonic shape 57 having retro rockets 29, preferably four of these, canted outwardly so that their exhaust will clear the sides of the fuselage 1. Positioned opposite each other and jutting through slots 66 in the cone 46 are a pair of carbon vanes 30 which control the pitch and roll of the spacecraft fuselage 1 within the atmosphere by swiveling movement upon a pivotal pin 56 and this movement actuated through control systems 67 operated by the astronaut 3 illustrated in FIG. 2.

Figures 4, 5, 7, 8:
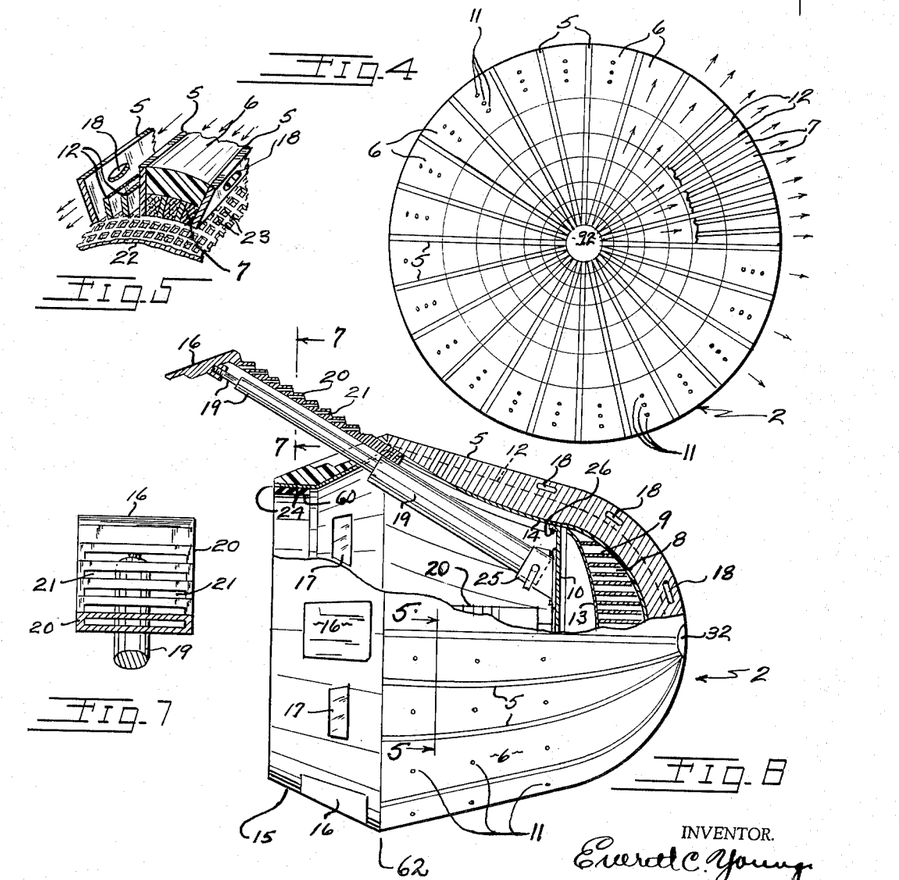
FIG. 4 is an enlargened head-on view of the front of the buffer illustrated in FIG. 3 in which it clearly defines the radial symmetry of the fins which are indicated by the pairs of parallel lines emanating from the center of the buffer, and the arrows of which show the direction of flow of air and melted or ablated material from the surface of the done shaped configuration.
FIG. 5 is a perspective partly in section, of a fragmentary segment removed from the buffer illustrated in FIG. 6 showing how the material has been completely removed by aerial frictional ablation and channelled out from between one set of fins; whereas, the adjacent cross section in the same illustration shows how the section would appear before any material has been removed by aerial friction, and also illustrates the metal netlike construction with meshes which appears underneath the fins and sections of material.
FIG. 7 is a cross sectional view of the extended appendage shown in FIG. 6 illustrating the rectangular openings therein and part of the telescoping structure which supports it.

In FIG. 2 and FIG. 4 the pairs of parallel lines emanating from the center 32 of the buffer 2 represent the stabilizer buffer fins 5 which are spaced in radial symmetry about the buffer 2 and which form tapered plastic segmented sections 6. Beneath the plastic segmented sections 6 are the segmented dry sand cores 7 with vent holes 11 for escaping carbon dioxide gas sublimating from the Dry Ice 8. The hollow inside portion of the buffer 2 is lined or formed by a circular metal beryllium shield 14 and a metal bottom support 13 also composed of beryllium. The cylindrical telescoping construction 24 is in retracted position in FIG. 2 and thus forms a space 36 between the nose portion 41, the beryllium shield 14, and the circular bottom support 13 for enclosing a vacuum before re-entry into the atmosphere. Capturing or enclosing a vacuum in this space 36 within outer space beyond the atmosphere is easily accomplished since the astronaut 3 merely moves the buffer 2 forward to allow oxygen molecules taken up from the ground launching pad to escape into the vacuum of space and then when he closes the buffer 2 back over the front of the nose portion 41 a vacuum is enclosed for use as insulation against heat penetration during re-entry.

With reference to FIG. 2 note that the astronaut 3 sits in a swivel seat 37 the back and bottom of which are well cushioned and custom made so as to fit the entire rear contour and form of his body. This swivel seat 37 within the center of the cockpit 59 is secured to a turntable 48 which is affixed to a strong pivotal support 49 which is secured to a stationary base 63. Another purpose of the turntable 48 is to provide a circular shelf upon which oxygen tanks, food, photographic materials, and other essentials can be placed for immediate use by the astronaut 3. The safety glass canopy 4 encloses the top portion of the cockpit 59 and is sealed and made airtight. A guard rail 39 serves as a rail upon which the buffer 2 slides over when it falls off as illustrated in FIG. 8c and this guard rail 39 also serves as an aeronautical fin for stabilizing the flight of the spacecraft fuselage 1 as well as protection for the glass canopy 4 to prevent damage to it when the buffer 2 falls away or is ejected. The cockpit 59 has two instrument control panels, one of these located in front of the astronaut 3 called the space flight instrument panel 54 indicated by a dotted line and the other one located in the front of the nose portion 41 called the atmospheric flight instrument panel 53 also indicated by a dotted line and which has a steering wheel 52 attached thereto. In orbit around a planet or during a journey through space the astronaut 3 has the added convenience of a pair of cockpit lights 50 indicated by a dotted line above the space flight instrument panel 54 and these project light against the inner beryllium shield 14 and the metal bottom support 13. This light is reflected by a highly polished special reflecting surface upon the said beryllium shield 14 and the metal bottom support 13. This reflected light illuminates the entire interior of the cockpit 59 including specifically the instrument panels and control systems 67. Another pair of lights much larger in size and light projection are the landing lights 51 which are situated outside of the cockpit 59 and the glass canopy 4 and which are positioned on opposite sides of the cockpit 59 and the space flight instrument panel 54. The shock absorber spring 65 serves to cushion the brunt of collision with various densities of the atmosphere and provides the astronaut 3 with a much smoother ride during flight.

The safety glass canopy 4 and the guard rail 39 are assembled in the factory as a complete unit and then secured to the outer front nose portion 41 by a hinge 64 positioned directly at the point of the nose portion 41. Therefore when the astronaut 3 desires to prepare for space flight he merely places one of his feet upon the metal step 38 and then grasping the stationary handle 47 with one hand he lifts or swings open the glass canopy 4 with the other hand and then climbs into the cockpit 59 and seats himself in the swivel seat 37. After he has seated himself in position facing the space flight instrument panel 54 and has strapped himself to the swivel seat 37 he merely closes the glass canopy 4, secures it tight and then personnel on the launching pad secure the already refrigerated buffer 2 containing Dry Ice 8 over the cockpit 59 and the astronaut 3 and then position him and his spacecraft fuselage 1 and the buffer 2 atop a rocket booster with the hypersonic shape 57 pointed skyward.

Further reference is made to FIG. 2 in which the cross section of the buffer 2 shows the refrigerating portion which is composed of compartments of Dry Ice 8. The plastic partitions 9 forming these compartments are secured between the metal bottom support 13 and the hemispherical shape of the metal netlike construction 22 also indicated in FIG. 5. This netlike construction 22 consists of meshes 23 or openings as illustrated in FIG. 5 and the small grill fins 12 are clearly shown. Referring still to FIG. 5, which is a perspective of a fragmentary segment taken from the buffer 2 illustrated in FIG. 6, it is precisely illustrated how the plastic segmented sections 6 are molded securely in place between the stabilizer buffer fins 5 and further anchored by the flow of plastic through the openings 18 during the molding operation and which have now solidified as indicated in FIG. 2 and FIG. 6. The grill fins 12 embodied within the metal netlike construction 22 are illustrated here in FIG. 5 and FIG. 4 where they also emanate from the center of the buffer 2 and are evenly spaced between the stabilizer buffer fins 5 and in radial symmetry.

A slight modification of the buffer 2 is illustrated in the drawings in FIG. 6 and FIG. 7 in which one of the four appendages 16 is shown in extended position. The buffer 2 is essentially of the same construction as described heretofore but the appendages 16 are spaced equidistantly around the circular tapered rear portion 15 of the buffer 2 and are installed within the invention to make it an adjustable device for enlargening the total area of the buffer 2 for further braking action during re-entry. It is significant to note that when all four are in extended position each appendage 16 has rectangular openings 21 within the stairstep frame 20 and this configuration presents the same function as a shuttlecock since a limited amount of air is allowed to pass through these rectangular openings 21 and a limited amount of air is resisted by the stair step frame 20 as the buffer 2 and the fuselage 1 move at high velocity through the atmosphere during re-entry. Each appendage 16 is extensible and retractable through openings in the side of the rear tapered portion 15 of the buffer 2 and each is supported underneath by a telescoping support device 19 mounted at one end within a flange 25 which is affixed to a base plate 10 covering the metal bottom support 13. The retracted position of these appendages 16 can be seen as the rectangular outlines of them are plainly visible in FIG. 6. Even the rectangular portholes 17 can be seen that are space equidistantly between these appendages 16. The most convenient time to use these extended appendages 16 is immediately after the critical re-entry velocity has been attained and there is no more burning taking place on the front surface of the buffer 2. In other words these appendages 16 are to be extended at the lower end of the flight trajectory when the velocity of the spacecraft fuselage 1 and the buffer 2 has been considerably reduced by the burning buffer 2 said burning producing a natural aerodynamic drag within the surrounding airstream.

The prefabrication of such a protective buffer 2 as illustrated in the various drawings requires that the plastic segmented sections 6 be molded from a plastic composed of a fibrous bond affording high tensile strength and having impregnated within it minute particles of limestone. Imbedded near the forward surface of the plastic sections 6 is a chemical such as sulphur and only enough to commence the combustion on these cold segmented sections 6 at the early part of the re-entry during the critical high velocity since the sooner this burning takes place on the front of the buffer 2 the quicker the spacecraft fuselage 1, the burning buffer 2, and the astronaut 3 will be braked or slowed considerably upon re-entry. The limestone within the plastic gives off large quantities of carbon dioxide as it burns or ablates and offers some protection in that it prevents the airstream from becoming extremely hot. Actually the burning of plastic produces quantities of carbon dioxide since plastic is a by product of coal. The stabilizer buffer fins 5, the grill fins 12, and the metal netlike construction 22 are all cast in the foundry in one operation. The openings 18 and the meshes 23 indicated in FIG. 5 are formed by the use of sand cores, which after the molding operation, are sandblasted out of the construction. The inner shield 14 and the metal bottom support 13 are both made from stamped beryllium .125 gage and is to have ribbing or beading for providing the necessary tensile strength needed or the use of elongated "T" support channels spaced equidistantly around the inside of the shield. Sections of this beryllium shield 14 are to be stamped and then assembled to form the dome shape construction illustrated in the drawings.

The refrigeration portion consisting of the plastic partitions 9 can be molded in one operation and this plastic construction is to be reinforced with a strong fiberous material. These plastic partitions 9 can have honeycomb construction or rectangular shape and these are filled with Dry Ice 8 and kept under refrigeration before launch time. Plastic must be used in this construction or at least some other non-metallic element because metal will vibrate or become excited when in contact with the Dry Ice 8. After the refrigeration portion containing the Dry Ice 8 is pushed into position within the buffer 2 and secured against the metal netlike construction 22 the metal bottom support 13 is positioned directly in back of it and then bolts 25 are secrewed into place around the circumference of the bottom support 13. The stabilizer buffer fins 5, the grill fins 12, and the metal netlike construction 22 can be cast from columbium, molybdenum, or Rene 41, and have a much higher melting or kindling temperature than does the plastic segmented sections 6 between them. Since a construction provides for differential liquefaction and differential ablation since one material will be melting and burning out before and/or faster than the other material as the buffer 2 bears the brunt of collision with the atmosphere during re-entry at high velocity. In this manner the stabilizer buffer fins 5 protrude more and more on the front of the buffer 2 since these fins 5 have a higher kindling temperature and since the plastic segmented sections 6 with the lower kindling temperature melt or burn out between the fins 5. Under such conditions the protruding fins 5 then become stabilizers to maintain the buffer 2 and the fuselage 1 in an upright position during high-speed re-entry, thus aiding the astronaut 3 to sit upright in piloting position for convenient control of his craft.

Still referring to FIG. 2 the dry sand cores 7 form a shell of substantial dome shape configuration consisting of segmented sections which lie directly beneath the plastic segmented sections 6 and the functional characteristics and purpose of these are nearly the same as when used in regular foundry practice. That is, these sand cores 7 come into contact with hot molten plastic during the molding process and absorb gases in the same manner that cores are used in foundry practice with molten metal. The other purpose of these sand cores 7, however, is to scatter the unmelted or burned material out away from the spacecraft fuselage 1 by slippage movement when the said material is swept across the sandy surface. Note that the inner beryllium shield 14 has a slightly hypersonic configuration and the sides slope outwardly toward the apex 62 of the buffer 2. By such a construction there is afforded a smaller angle of attack after the critical re-entry velocity has passed and when the outer plastic segmented sections 6 have been carved out or melted out and this sandy layer then crumbles and scatters away or helps to eject outwardly the particles of unburned, unmelted, or charred material between the fins 5 as the fuselage 1 and the buffer 2 come nearer the earth. These dry sand cores 7 must possess a great number of physical properties among these being the following:

(A) They must have a very strong dry bond strength and this is the strength of the core after it is baked in an oven and is usually measured in tensile or transverse strength. Reinforcing such sand core 7 with metal lath will increase their strength tremendously.

(B) They must have good permeability as this feature of the core is what permits the passage of gases through it. Not only is this feature needed during the molding process as mentioned heretofore but it is quite necessary when the buffer 2 and the spacecraft fuselage 1 are in outer space as good permeability allows the carbon dioxide escaping from the sublimating Dry Ice 8 to enter these sand cores 7 and completely saturate the pores within them. However, when extreme cold areas in space are traversed there will be no sublimation from the Dry Ice 8. Also since there are only such a few oxygen molecules in outer space this sublimation is almost completely retarded since there is nothing to carry away the carbon dioxide. It has been determined from extensive research that the temperature of space is −459 degrees F. and therefore when the buffer 2 containing the Dry Ice 8 travels through space there will be no sublimation since it is hidden from the radiated heat from the sun. Furthermore, the degree of cold in the materials including the sand cores 7 within the buffer 2 will be so extremely cold after a few hours in space flight that the entire buffer 2 will be in a frigid state although variable depending upon the balance achieved between the rate of absorption of solar heat on the side exposed to the sun, the rate of radiation of any absorbed heat while in space, and how well insulated the plastic partitions 9 are in containing the already frigid cold of the Dry Ice 8.

(C) Smoothness of the surface of the baked dry sand cores 7 must be excellent.

(D) Friability of the cores 7 must be good as it must have the ability to crumble and be easily removed and channeled out from between the stabilizer buffer fins 5 after the plastic segmented sections 6 have melted and/or ablated out by the increased air pressure on the front of the buffer 2 or during the aerial frictional heat of re-entry.

(E) These sand cores 7 must have vent holes 11 for escapement of any possible sublimating Dry Ice 8 and this is accomplished by two very well known methods. The first method is to use a vent wire at the time the core is being rammed. The second is by placing wax tapers in each sand core 7 at three different places one of which is positioned directly at the side of the Dry Ice 8 illustrated in FIG. 2. These wax tapers are rammed inside of the cores 7 and when these cores 7 are baked, the wax melts and runs through the pores in the sand grains, leaving an opening or vent holes 11 as required.

Another method of affixing the plastic segmented sections 6 over the sand cores 7 is to mold these separately and then place them into position between the stabilizer buffer fins 5.

Figure 8A:
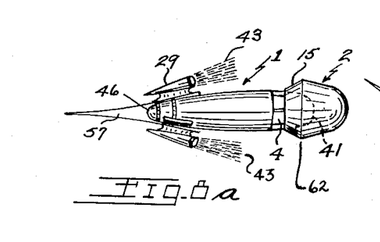
FIG. 8a is a view of the buffer extended in the forward position away from the fuselage and indicating the exhaust fire from the retro rockets which are firing to slow the speed of the spacecraft prior to reentry of the atmosphere.
Figures 8B, 8C, 8D:
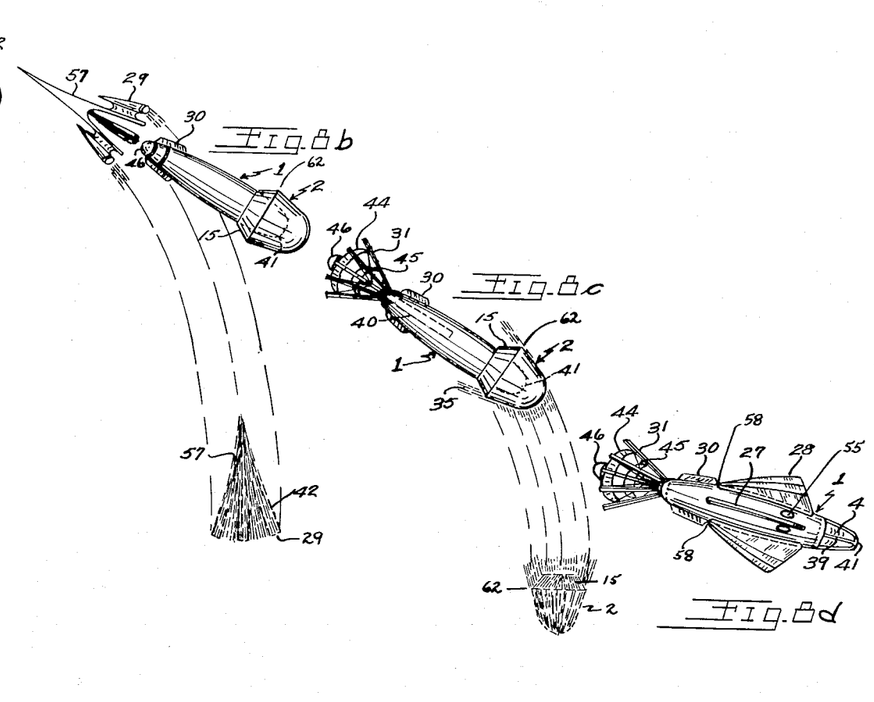
FIG. 8b illustrates that the buffer has been moved rearwardly and secured over and around the front of the spacecraft fuselage and the retro rockets are being removed by air pressure buildup as the whole spacecraft fuselage including the buffer descends at high velocity into the denser atmosphere while the retro rockets take on another trajectory and burn up during their fiery descent.
FIG. 8c shows the burning buffer and spacecraft fuselage descending further within the denser atmosphere whereby the heat on hte front of the buffer is being dissipated laterally away from the sides of the fuselage; and whereby the shuttlecock configuration has extended out into the airstream in back of the tail end portion of the fuselage braking or slowing the speed of the whole craft so considerably that the buffer falls away as shown and burns up or disintegrates during its fiery descent.
FIG. 8d illustrates how a completely unique and sophisticated flying vehicle is made airborne by adjustable wings, adjustable appendages, and other aerodynamic control surfaces as well as the shuttlecock configuration shown at the rear which affords the necessary stability and braking action needed for reduction of speed to assume a maneuverable position for flight to a landing.

In order to best describe and specify how this invention of the buffer 2 functions with respect to re-entry of the atmosphere reference is made to the four illustrations in FIGURES 8a, 8b, 8c, and 8d, on the one sheet of drawings. FIG. 8a shows the spacecraft fuselage 1, retro rockets 29, cone 46, hypersonic shape 57, and buffer 2 in the position that it would appear as it circles a planet in the orbital path or as it would appear upon returning from a journey through space. In preparation for entry of the atmosphere the astronaut 3 sitting within the cockpit 59 shown in FIG. 2 fires the retro rockets 29 in sequence and while doing so he observes the firing by looking out the glass canopy 4 while the buffer 2 is in extended position, or if he chooses he can close the buffer 2 up against the spacecraft fuselage 1 and look through the rectangular portholes 17. When the astronaut 3 by the use of manual control moves the buffer 2 rearwardly on the cylindrical telescoping construction 24 and it seals itself over and around the cylindrical gasket 60 illustrated in FIG. 2. This maneuver encloses or captures a vacuum within the space 36 between the nose portion 41 and the inner beryllium shield 14 and the metal bottom support 13, since upon extending the buffer 2 prior to this permitted the oxygen molecules carried up from earth to escape into the vacuum of outer space. This enclosed vacuum provides a good insulator against the possible penetration of heat by convection or conduction in the case of a poorly manufactured buffer 2. Also, since a vacuum cannot prevent radiated heat then further protection is offered by the Dry Ice 8 which maintains the adjacent materials in a very cold state and then the Dry Ice 8 itself prevents radiated heat 100 percent since it dissipates any heat laterally 100 percent.

In FIG. 8a the astronaut 3 observes the firing thrust 43 of the retro rockets 29 and then in FIG. 8b the illustration shows that his craft has been slowed or braked enough by the thrust 43 that gravitational forces effect his craft and the whole spacecraft fuselage 1, and buffer 2 commence to fall into the atmosphere at high speed of over 10,000 miles per hour. During the start of this descent the retro rockets 29 jutting out into the airstream set up a strong resistance to forward and downward movement of the craft and soon air pressure buildup in conjunction with release of them by manual control by the astronaut 3 pushes these retro rockets 29 completely clear rearwardly from the fuselage 1 and they then take on another trajectory as indicated by the drawing in FIG. 8b forming a tapering fire 42 with the hypersonic shape 57 producing a fiery tail. Upon returning from journeys through outer space the craft would re-enter the atmosphere at speeds of well above 17,000 miles per hour and possibly speeds of 25,000 to 50,000 miles per hour or more might be attained. With such speeds, however, this invention of the buffer 2 is designed to burn and faster speeds only enhance the usefulness of it, as tremendous speeds bring about an increase in frictional resistance which is more favorable to orientation. Since meteorites, which travel nearly five times the speed of present day re-entry vehicles, have hit hay stacks and dried leaves and after examining these specimens it was found that there was not even any charring on the straw or leaves still sticking to the specimens and there were no fires started then it is only logical that greater speeds enhance the carving or differential liquefaction and differential ablation of the buffer 2.

In FIG. 8c it still illustrates the closed position of the buffer 2 over the fuselage 1 and how the buffer is burning which is indicated by the flame 35 which forms a halo or bright shroud around the buffer 2 and the fuselage 1. This burning takes place the moment the craft enters the denser atmosphere at high velocity and immediately after the retro rockets 29 have been removed by air pressure buildup as explained heretofore, will continue this burning only during the critical time of re-entry when the velocity is at its maximum. During this burning stage only the outer plastic segmented sections 6 are completely melted, and stripped out from between the stabilizer buffer fins 5 illustrated in FIG. 2 and FIG. 5. In FIG. 5 the fragmentary segment shows how the section looks before and after the burning as the left side of the illustration shows that the materials have been entirely removed from between the stabilizer buffer fins 5 and the grill fins 12 whereas between the adjacent pair of fins 5 the material is clearly indicated as it would appear before the burning stage.

In 8c it is clearly indicated that another construction consisting of elongated support bars 31, a wind sock 45, a chain mail chute 44, and a cone 46 form a design of substantial shuttlecock configuration which has entered the airstream after being ejected from an elongated circular tube 40 indicated by a dotted line. This shuttlecock configuration as aforementioned further slows the speed of the fuselage 1 and the buffer 2. However, upon its entrance into the airstream the sudden braking action in conjunction with the release of the buffer 2 by the astronaut 3 causes the buffer 2 to slide over the guard rail 39 and become detached from the cylindrical telescoping construction 24 and then fall away in another trajectory towards earth. As FIG. 8c illustrates the burning buffer 2 is falling in a fiery descent. This shuttlecock configuration is pushed or ejected out into the airstream when the astronaut 3 releases it by control systems 67 within the cockpit 59 and then air pressure strikes the front circular edge of the cone 46 and pushes it rearwardly. As this cone 46 moves rearwardly it pulls the chain mail chute 44, the elongated support bars 31, and the wind sock 45 along with it into the airstream. Then when air inflates the chain mail chute 44 and the wind sock 45 their expansion and inflation outwardly from the center spreads the longated support bars 31 to form a construction of substantial shuttlecock configuration as appears in the drawing. This said configuration resembles the shuttlecock employed in the game of badminton and its use is the same in that it resists a considerable amount of air while at the same time a lot of air is allowed to pass through.

Referring again to FIGURES 2, 4, 5, 6, and 8c it is important to note that the plastic segmented sections 6, which are impregnated with minute particles of limestone and sulphur burn fiercely during the critical re-entry velocity and the burning limestone gives off carbon dioxde which prevents the airstream around the spacecraft fuselage 1 from becoming too hot and certainly not as hot as would occur if the limestone were not used at all. These plastic segmented sections 6 also have a reinforcing fibrous material within as mentioned heretofore which aids in maintaining uniform combustion and ablation during high velocity. Just as the forward surface of a meteorite melts during the blazing-hot or fiery part of its flight through the atmosphere so do the plastic sections 6 on this buffer 2. Then as soon as these sections 6 have been stripped from between the stabilizer buffer fins 5 the onrushing colliding air molecules strike the sand cores 7 and immediately crumble them and in turn the sand scatters or breaks up any remaining melted, unmelted, burned, or unburned particles of material and the air pressure dissipates these particles outwardly from a point around the circumference of the buffer 2 known as the apex 62. The advantage of this burning buffer 2 is very apparent here as the burning plastic sections 6 present a halo of flame pressure in the airstream surrounding the craft and this presents a natural aerodynamic drag. There would be no heat penetration since the plastic sections 6 and the neighboring materials are already maintained in a rear frigid or completely frigid condition. This fact coupled with the fact that there is a critical velocity at which ablation outruns heat penetration makes it apparent then that there would be no heat conduction since the material between the fins 5 is stripped away as fast as new fresh cold material is exposed.

With respect to braking the craft upon re-entry at velocities above 10,000 miles per hours there would be three methods involved. First, the halo of flame 35 illustrated in FIG. 8c is forced into the airstream by increasing air pressure on the front of the buffer 2 as the craft descends at high speed into hte denser atmosphere, thus presenting the aerodynamic drag already mentioned. Second, after the segmented sections 6 have burned out, the four appendages 16 shown in FIG. 6 can be extended to further slow the re-entry speed of the craft, and third, near the bottom end of the trajectory the aforementioned shuttlecock configuration can be employed.

A phenomenon worth mentioning here is the fact that the upper level of the troposphere 5 to 10 miles above the earth has a rather constant temperature over the United States of about $-67$ degrees F., surprisingly, over the North and South Poles the temperature remains about $-50$ degrees F., and over the equator about $-100$ degrees F. This fact in conjunction with the burning, frigid or cold buffer 2 containing Dry Ice 8 will work favorably with this invention as after burn out of the plastic sections 6 has occurred the remaining beryllium shield 14, the metal network construction 22, the grill fins 12, and the stabilizer buffer fins 5 will actually be cooling since the extreme coldness of the Dry Ice 8 will continue to seep outward at the same time that the buffer 2 with its remaining construction of materials will be passing through cold air of $-67$ degrees F. in the upper reaches of the troposphere. Actually any unmelted plastic or fusion crust collecting at the apex 62 will "freeze" or harden under such cold conditions in the same manner that a meteorite does when it falls to the ground. This is part of the reason that meteorites do land on the ground in a cold condition. It cannot be emphasized too strongly that meteorites do not strike the earth in blazing flight or in a molten condition according to extensive research by meteoriticists and that nearly all of them are actually cooling off before they land on earth. The strong parallelism between this invention of the buffer 2 and the falling meteorite becomes very apparent as it takes only elementary reasoning to realize that a very cold material will take much longer to heat up than if the same material were at its normal temperature, and if the material is in a frozen condition and traveling through the atmosphere at high velocity it becomes very apparent that the forward surface will melt and be stripped away by air pressure so quickly that no frictional heat can penetrate.

If in the event the astronaut 3 prefers a longer flight trajectory upon re-entering the atmosphere there is a possibility that the metal netlike construction 22 might become hot enough to burn. For this reason it and the grill fins 12 are composed of a high carbon content and impregnated with limestone particles so that when this material burns it will produce or give off carbon dioxide. This by-product of burning in conjunction with the escaping carbon dioxide sublimating from the Dry Ice 8 during re-entry will shield and protect the sides of the spacecraft fuselage 1 from possible burning. Since the Dry Ice 8 sublimates much faster only under a higher temperature than itself and even much faster when rapidly moving oxygen contacts it, then it is obvious why there will be an abundance of carbon dioxide surrounding the spacecraft fuselage 1 when the whole craft is traversing the atmosphere at a fairly high velocity. In fact, should the metal network construction 22 and the grill fins 12 burn during re-entry this type of combustion will not be as hot as a blue flame or even produce a blue flame because combustion in itself is some protection because it gives off carbon dioxide. Merely by placing a blue flame torch upon a piece of wire mesh with a considerable amount of carbon content will show that the blue flame is reduced to a yellow flame as it passes through the meshes and contacts the wire. Therefore, should the grill fins 12 burn, this type of combustion can do no harm because the cooler yellow flame getting through will strike the plastic partitions 9 of Dry Ice 8 and be extinguished. Only a shroud of smoke containing large quantities of carbon dioxide will surround the spacecraft fuselage 1 as it nears the end of its flight trajectory. Actually the carbon dioxide created by the burning will only add to the quantity of carbon dioxide being sublimated by the Dry Ice 8.

One of the most important advantages of this burning buffer 2 is illustrated in FIG. 8d wherein this drawing clearly indicates the extended pair of telescoping wings 28 on the sides of the spacecraft fuselage 1 which protrude into the airstream to give lift and maneuverability to the craft. Since the buffer 2 has fallen away as indicated in the previous drawing in FIG. 8c it is apparent now how the astronaut 3 can use his swivel seat 37 to turn 180 degrees to a piloting position facing the atmospheric flight instrument panel 53 and steer his vehicle by use of the steering wheel 52 for maneuverable flight. The chain mail chute 44, the wind sock 45, and the elongated support bars 31 help to stabilize the flight of the craft and a pair of carbon vanes 30 swivel up or down on the sides of the fuselage 1 to give the craft pitch and roll while the astronaut 3 sits in piloting position looking out the glass canopy 4 of the cockpit 59. The telescoping wings 28 fan out or move outward from within the fuselage 1 as a strong pivotal pin 58 illustrated in FIG. 1 secures the pivoting end of the wings 28 within the fuselage 1. A pair of emergency parachute compartments 55 containing parachutes are available to the astronaut 3 should he need them in an emergency to drop the whole craft and himself to the ground. These parachute compartments 55 are located on the top of the fuselage 1 and are on opposite sides of the elongated fuselage fin 27 which is also used for stabilizing the flight.

Of most significance to present day state of art this invention of the buffer 2 illustrated in FIGURES 8a, 8b, 8c, and the other various drawings shows how the composite entry can be achieved. That is, an entry into earth's atmosphere whereby the spacecraft fuselage 1 enters without lift and then later on at the end of its trajectory use lift. By employing telescoping wings 28, other controllable appendages, and rockets 34 which are used for propulsion and which are indicated in FIG. 1 by a dotted line within the cowlings 33, the astronaut 3 can actually fly a sophisticated vehicle to any airport on the ground or fly to a landing on an aircraft carrier.

Of further significance to mankind is the fact that this frozen burning buffer 2 on the front of spaceships re-entering the atmosphere will present a spectacular sight in the sky at night, as the fiery appearance of it will create a ball of fire in the heavens and its flaming tail will resemble a nearby meteor when viewed by the naked eye. It will present quite a show.

It is to be understood that the forms and materials of the invention, herein illustrated and described, are to be accepted as preferred embodiments, and that various modifications in the shape, size, arrangement, or composition of the components and elements may be resorted to without departing from the spirit of the invention, or the scope of the following claims.

I claim:

1. An aeronautical buffer construction on one end of a manned re-entry body comprising, in combination, means for enclosing a vacuum in outer space, and means for ejection of said buffer construction during entry of a planetary atmosphere.

2. An aeronautical construction on one end of a manned device comprising, in combination, means for enclosing a vacuum in outer space, and said construction acting as means for protection against collision with meteorites.

3. An aeronautical construction on one end of a manned device according to claim 2 wherein said means for enclosing a vacuum in outer space includes selective movement means whereby a portion of said construction is made open and then closed to entrap a portion of the near-perfect vacuum in outer space.

4. The apparatus as recited in claim 2 wherein said means for enclosing a vacuum within said device includes means for selective movement whereby a portion of said device enveloping said vacuum can be made open.

5. The apparatus as recited in claim 2 wherein said aeronautical construction on one end of said manned device includes extensible means for increasing the drag brake action on said manned device.

6. A buffer construction on one end of a craft comprising, in combination, means for enclosing a vacuum within outer space, means for refrigeration of said buffer construction, means for differential ablation during high-speed entry of a planetary atmosphere, means for ejection of said buffer construction during said high-speed entry, and means for maneuverable flight of said craft as a result of said ejection of said buffer.

7. An aeronautical buffer construction on one end of a spacecraft comprising, in combination, means for forwards and backwards movement of said buffer construction on said spacecraft, and means for enclosing a vacuum in outer space.

8. An aeronautical buffer comprising, in combination, a plurality of extensible appendages positioned in radial symmetry upon and within said buffer, a plurality of stabilizing fins placed in radial symmetry around a forwardly disposed portion of said buffer and having a substantial dome shape configuration, said extensible appendages for gradual braking the speed of said buffer during high-speed entry of an atmosphere, and said fins for maintaining said buffer in an oriented position during said high-speed entry.

9. In a high-speed craft, a front portion comprising an outer shell of segmented plastic spaced in radial symmetry around the said front portion, a nucleus for containing a refrigerant centrally disposed within said front portion, said nucleus having a forwardly disposed surface of semi-spherical configuration, a plurality of grill-like fins covering said forwardly disposed surface, and a plurality of segmented dry sand cores positioned beneath said segmented plastic and atop said nucleus and said grill-like fins.

10. In combination with a manned re-entry body comprising an assembly providing an aerodynamic profile on one end of said body, said assembly having means for encasement of a vacuum within as insulation against heat penetration during high-speed entry of a planetary atmosphere.

11. In combination with a manned re-entry body comprising a buffer providing means for progressive braking sequentially the speed of said re-entry body, means comprising, in combination, a combustible buffer during early high-speed entrance of an atmosphere and extensible appendages on said buffer for further braking said high-speed of said re-entry body after said entrance.

12. A protective buffer having a composite construction forwardly disposed comprising, in combination, stabilizer fins, segmented plastic sections between said fins, and the structural extremities of the leading surfaces of said fins coinciding with the anterior surfaces of said segmented plastic sections to form a substantially dome shaped configuration.

13. A manned re-entry vehicle comprising a buffer mounted on the front portion of said vehicle, said buffer having a substantially dome shaped configuration which is subjected to combustion to thereby produce a fiery sheath about said buffer resulting from transient reaction with an atmosphere during re-entry, and a rear portion of said vehicle including means which supports an extensible construction of substantially shuttlecock configuration whereby said fiery sheath about said buffer slows the speed of said vehicle during atmospheric re-entry.

14. A manned re-entry vehicle comprising a buffer mounted on the front portion of said vehicle according to claim 13 wherein said buffer comprises a non-burnable layer within said buffer having means for terminating said fiery sheath during atmospheric re-entry thereby providing a period of time for uninterrupted radio communication.

15. A spacecraft having a buffer mounted on the front end thereof, said buffer including means for protecting said spacecraft from thermal destruction during atmospheric re-entry, and means connected between said buffer and said front end for enclosing a vacuum there between by selective movement of said buffer.

16. An aeronautical re-entry craft including a protective buffer mounted on the front end of said craft, said craft comprising flight means in outer space and in an atmosphere; the improvement for cushioning said craft during collisions, said improvement comprising shock absorbing means between said front end of said craft and said buffer whereby said shock absorbing means cushions said craft during collisions with meteoroids and orbiting bodies and whereby said shock absorbing means partially absorbs the vibrations and shock produced by said buffer when said buffer is colliding with an atmosphere during high velocity re-entry.

17. In a spacecraft having a sheath on a cabin thereof said sheath comprising means for enclosing a vacuum adjacent to said spacecraft; the improvement of means to provide a composite re-entry of said spacecraft in a planetary atmosphere, said composite re-entry means comprising wings pivotally mounted to said spacecraft and means on said spacecraft for telescopingly extending said wings whereby said spacecraft is protected by said sheath during early stages of re-entry and whereby said spacecraft uses said wings for maneuverable flight during later stages of said re-entry.

18. A buffer on the front end of a space-locomotive comprising stabilizing means for orienting said buffer including means for differential ablation whereby the forwardly disposed materials of said buffer progressively ablate at different rates when imposed by high velocity re-entry to form said stabilizing means.

19. An improved spacecraft comprising a cabin and a sheath upon said cabin, in combination, means for forward movement and backward movement of said sheath upon said cabin, means on said cabin including a transparent observation port through which a pilot can perform astronavigation when said sheath makes said forward movement, and means on said spacecraft for atmospheric re-entry.

20. A manned re-entry vehicle comprising a buffer mounted on the front portion of said vehicle, said buffer having a substantially dome shaped configuration which is made in part of readily combustible material and which is subjected to combustion to thereby produce a fiery sheath about said buffer resulting from transient reaction with an atmosphere during re-entry whereby said fiery sheath about said buffer slows the speed of said vehicle during atmospheric re-entry.

21. A manned re-entry vehicle comprising a buffer mounted on the front portion of said vehicle, according to claim 20 wherein said vehicle enters an atmosphere without the use of lifting appendages that provide lift, and lifting appendage means for use during a later stage of said re-entry.

22. A manned re-entry vehicle according to claim 21 in which said lifting appendage means comprises pivotally mounted wings extendible in varying degress for hypersonic, supersonic, and subsonic speeds.

23. A manned spacecraft for use in outer space having an aeronautical construction on one end comprising, in combination, refrigeration means within said spacecraft capable of maintaining the materials of said construction in a super cooled state, means connected within said construction and said craft for enclosing a vacuum and means for insulating said refrigeration means by selective movement of said construction whereby opening a portion of said construction exposes said refrigeration means to a vacuum in said outer space.

References Cited by the Examiner

UNITED STATES PATENTS

| | | | |
|---|---|---|---|
| 2,924,400 | 2/1960 | Ruget | 244—46 |
| 2,969,211 | 1/1961 | Von Saurma | 244—1 X |
| 2,980,370 | 4/1961 | Takacs | 102—50 X |
| 3,001,473 | 9/1961 | Shepheard | 102—92.5 X |
| 3,026,806 | 3/1962 | Runton et al. | 244—117 X |
| 3,028,129 | 4/1962 | Faillie | 244—117 X |
| 3,047,259 | 7/1962 | Tatnall et al. | 244—1 X |
| 3,093,346 | 6/1963 | Faget et al. | 244—1 |
| 3,107,619 | 10/1963 | Daniels | 102—92.5 |
| 3,119,576 | 1/1964 | Nielsen | 244—1 |
| 3,132,825 | 5/1964 | Postle | 244—1 |
| 3,138,009 | 6/1964 | McCreight | 244—117 X |
| 3,142,960 | 8/1964 | Bluck | 102—92.5 X |
| 3,158,336 | 11/1964 | Warren | 244—1 |

FOREIGN PATENTS 870,917   6/1961   Great Britain.

FERGUS S. MIDDLETON, *Primary Examiner.*

MILTON BUCHLER, *Examiner.*